July 8, 1969  M. M. LEVIN  3,453,949
BROILING PAN
Filed Nov. 13, 1967  Sheet 2 of 2
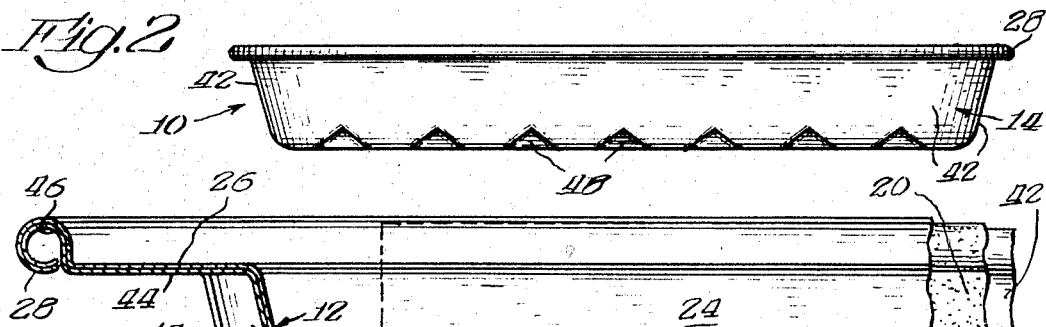
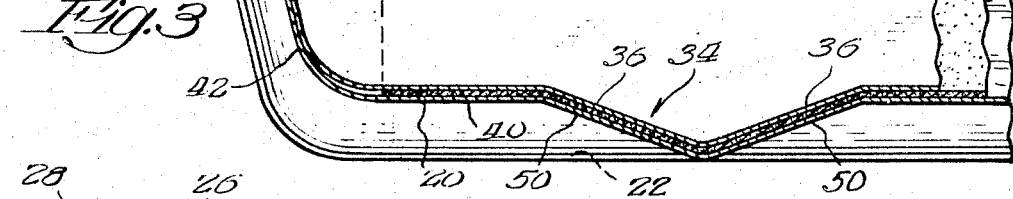
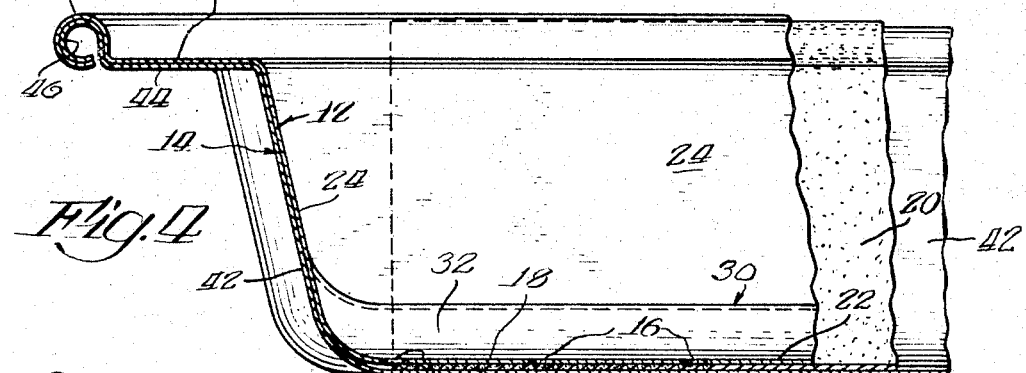
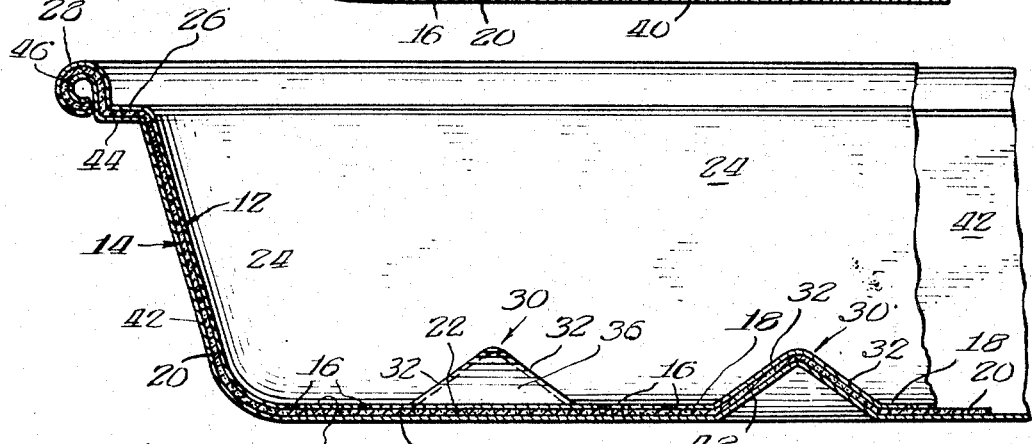
Inventor:
Myron M. Levin
BY MAX R. KRAUS ATTY

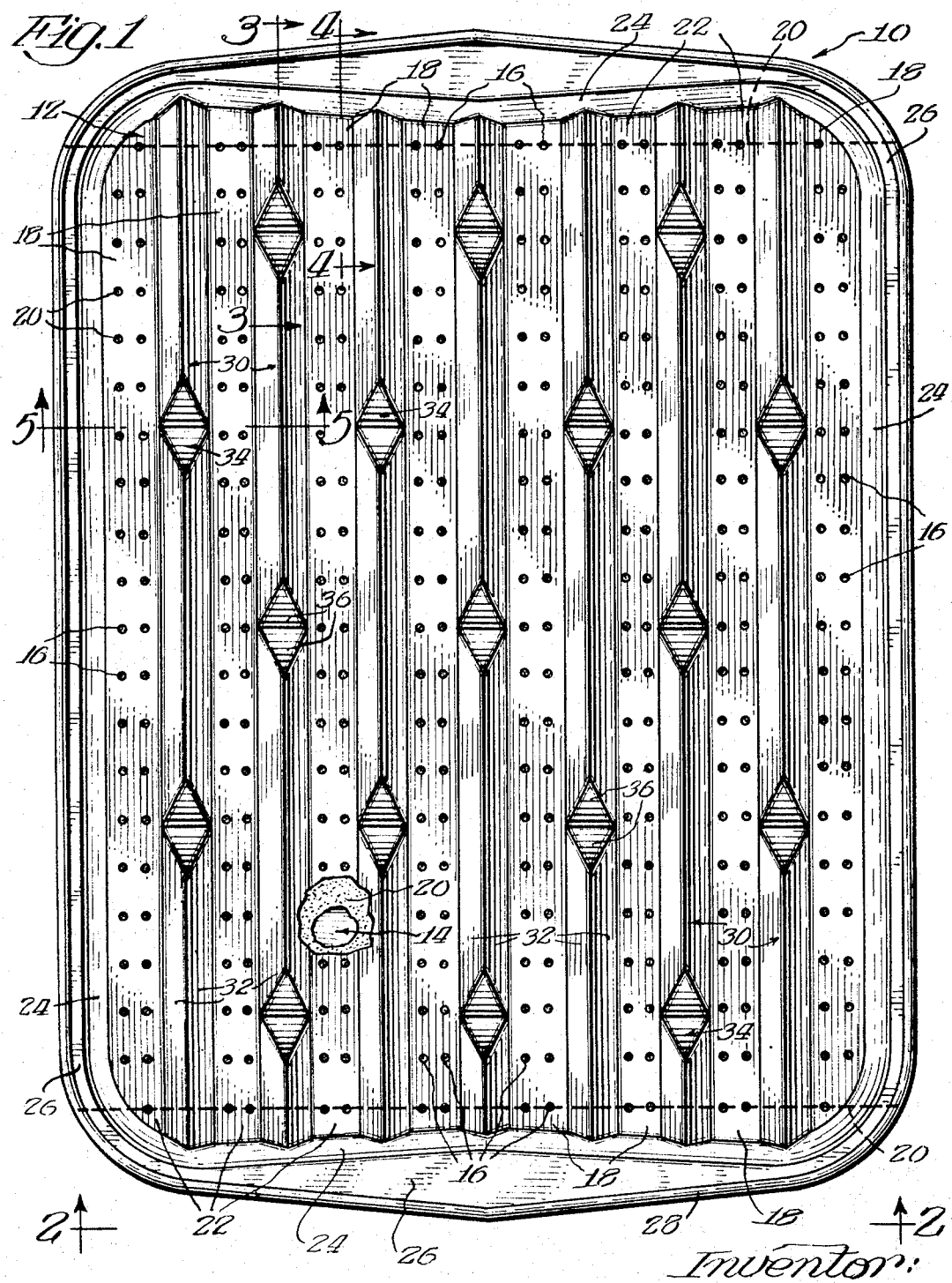

United States Patent Office 3,453,949
Patented July 8, 1969

3,453,949
BROILING PAN
Myron M. Levin, Lincolnwood, Ill., assignor to E-Z Por Corporation, Niles, Ill., a corporation of Florida
Filed Nov. 13, 1967, Ser. No. 682,431
Int. Cl. A47j 27/00
U.S. Cl. 99—446      6 Claims

ABSTRACT OF THE DISCLOSURE

A broiler pan formed of an inner member and an outer member made preferably of an aluminum foil and secured together, with an absorbent sheet between the bottoms of said members and with the bottom wall of the inner member provided with a plurality of spaced openings to permit the greases, fats and oils to pass through said openings and be absorbed by the absorbent sheet.

---

This invention relates to improvements in a broiler pan.

In broiling meats, fish, and the like, within a pan, the greases, oils and fats which are heated in the process of broiling are retained within the pan and this causes spattering. Also, the greases, oils and fats are not absorbed and the resulting spatter comes in contact with the food being broiled and also with the walls of the oven or cooking chamber. With this invention this is eliminated as the broiler pan is formed of inner and outer members with an absorbent material positioned between the two members and with the inner member having spaced apertures through which the hot greases, oils and fats pass to be absorbed by the absorbent material. Thus, the hot greases, oils and fats are drained from the inner pan and the objections inherent in the prior devices are eliminated.

An object of this invention is to provide a broiler pan made of an aluminum foil in which the hot greases, oils and fats are confined in trough-like members in the inner pan until they drain through the openings in the inner pan to be absorbed by the absorbent material.

Another object of this invention is to provide a broiler pan which may be inexpensively made and which may be discarded after each use and does not have to be cleaned. There is therefore provided a throw-away utensil which is very inexpensive and economical.

Other objects will become apparent as this description progresses.

BRIEF DESCRIPTION OF THE DRAWINGS

In the drawings:

FIG. 1 is a top plan view of the broiler pan forming this invention.

FIG. 2 is a reduced end view taken on line 2—2 of FIG. 1.

FIG. 3 is an enlarged sectional view taken on line 3—3 of FIG. 1, showing one end of the broiler pan.

FIG. 4 is an enlarged sectional view taken on line 4—4 of FIG. 1.

FIG. 5 is an enlarged sectional view taken on line 5—5 of FIG. 1, showing one side of the broiler pan.

DESCRIPTION OF THE PREFERRED EMBODIMENT

The broiler pan, generally indicated by the numeral 10, is formed of an inner aluminum foil member or section 12 and an outer aluminum foil member or section 14 which are crimped together, as will be more presently described. The bottom of the inner member or section 12 is provided with a plurality of small openings or apertures 16 which are arranged in troughs generally indicated at 18. The troughs extend lengthwise of the pan 10. An absorbent paper or like material, such as white whipcord, generally designated by the numeral 20, is positioned between the bottoms of the inner and outer sections 12 and 14.

The general configuration of the broiler pan is of rectangular shape, although it may be of any other desired shape. The inner member or section 12 is formed from a layer of aluminum foil and is shaped to form a pan-shape having an inner horizontal bottom wall 22 and upwardly extending continuous side and end walls 24 which continue outwardly to form a continuous horizontal lip 26 and then is curved or crimped to form a bead 28 extending around the perimeter of the pan. The bottom wall 22 of the inner section 12 is shaped to provide the spaced troughs 18 which are separated by triangular-shaped raised or ribbed portions generally indicated at 30, as best seen in FIGS. 1 and 5. The triangular raised or ribbed portions 30 have inclined side walls 32 sloping downwardly into the troughs 18. The bottom wall in the troughs are provided with the spaced apertures or small openings 16 so that any greases, fats and oils may pass through said openings to the absorbent layer positioned below the inner section.

The triangular-shaped ribs 30 extend lengthwise of the pan so that the troughs 18 formed thereby likewise extend lengthwise. The ribs 30 are provided with spaced depressions generally indicated at 34, best shown in FIGS. 1 and 3. The depressions 34 have downwardly sloping surfaces 36 which slope downwardly toward the center of each depression and the center point is indicated at 38, as best seen in FIG. 3. The spaced depressions 34, as shown in FIG. 1, provide communicating passageways between the longitudinally extending triangularly-shaped rib members 30 so that the greases, fats and oils which initially pass into the troughs 18 can flow through these communicating depressions 34 from one trough to the other and not be confined within a particular trough. This prevents an excessive accumulation of grease, fat or oil in any one trough.

As best shown in FIG. 1, seven longitudinally extending rib members 30 are shown and they divide the pan into eight longitudinally extending troughs 18. The number of ribs and troughs can be varied depending upon the size of the pan. As best seen in FIG. 1, the depressions 34 are in a staggered relationship between adjacent ribs 30. The depressions 34 in the alternate ribs are in alinement.

The outer section 14 which is formed of an aluminum foil has a bottom wall 40 with a continuous upstanding side and end wall 42, a horizontal lip 44 culminating in a bead 46. The absorbent paper sheet 20, which may be a white whipcord material, is positioned and interposed between the bottom 22 of the inner member 12 and the bottom 40 of the outer member 14 and is held therebetween in a firm position, as best shown in FIGS. 3, 4 and 5. The bottom wall 40 of the outer section is shaped complementary to the shape of the bottom wall 22 of the inner section. Briefly, the bottom wall 40 has triangular-shaped raised or ribbed portions generally indicated at 48, similar to the triangular ribs 30. It also has spaced depressions 50 in the ribs 48, similar to the depressions 34 in the ribs 30 of the inner section 12. The bottoms 22 and 40 of the inner and outer members are adjacent each other, the bottom 22 nesting within the bottom 40. They are however spaced and separated by the thickness of the absorbent paper 20. The openings 16 in the bottom of the inner member 12 communicate or are over the absorbent paper 20.

As best seen in FIGS. 3 and 4 which show the ends of the pan, the absorbent paper 20 is not interposed between the upstanding end walls 24 and 42 of the inner and outer members 12 and 14. It is however interposed between the upstanding side walls 24 and 42 of the inner and outer members 12 and 14, as best seen in FIG. 5, and is also interposed between the beads 28 and 46 running along the sides of the pan (FIG. 5). The upstanding side and end walls 24 and 42 of the inner and outer sections 12 and 14 are contiguous to each other as are the lips 26 and 44 and the bead 28 is crimped to surround the bead 46 to interlock the inner and outer sections together. The inner member 12 therefore nests within the outer member 14 and the two members are interlocked or secured together with the absorbent paper retained therebetween as described.

In broiling it will be found that by reason of the small openings or apertures 16 in the inner pan section 12 the greases, fats and oils will pass through said openings and be absorbed by the absorbent material 20. This eliminates the spattering of the fats, oils and greases which would occur if they were retained in the inner pan.

It will be understood that various changes and modifications may be made from the foregoing without departing from the spirit and scope of the appended claims.

I claim:

1. A broiler pan comprising, an inner metal foil sheet shaped to form a box-like tray with a bottom and upright side and end walls, said bottom having a shape forming a plurality of spaced troughs and spaced raised ribs, an outer metal foil sheet with a bottom and upright and side and end walls, with the bottom having a shape forming troughs and raised ribs to coincide and conform to the spaced troughs and spaced raised ribs of the bottom of the inner sheet so that the bottom of the inner sheet overlays and nests in the bottom of the outer sheet, a plurality of spaced small openings formed in the troughs of the inner sheet, a layer of absorbent material between the bottoms of said inner and outer sheets and of a thickness generally that of the thickness of the sheets, said layer of absorbent material having a cross-section corresponding to the shape of the bottoms of the inner and outer sheets, said bottom of the inner sheet being positioned contiguous to the bottom of the outer sheet except for the interposition of the absorbent material, said openings in the bottom of the inner sheet permitting the oil, grease and the like to pass from the bottom of the inner sheet to the absorbent material.

2. A structure as defined in claim 1 in which the side and end walls have horizontal lips which are contiguous to each other and are crimped together to form a bead to interlock the inner and outer sheets together.

3. A structure as defined in claim 1 in which the ribs are of triangular shape.

4. A structure as defined in claim 1 in which the ribs extend longitudinally of the pan and are triangular in shape and have spaced transversely extending depressions which form passageways between the troughs to permit the grease, oil and fat to pass from one trough to the other.

5. A structure defined in claim 1 in which the raised ribs have passageways which permit the greases, oils and fats to pass from one trough to the other.

6. A structure defined in claim 1 in which the troughs extend longitudinally of the pan.

References Cited

UNITED STATES PATENTS

| D. 187,304 | 2/1960 | Hopper et al. | |
| 1,301,197 | 4/1919 | Tully | 99—446 |
| 1,783,183 | 12/1930 | Dibble. | |
| 2,593,592 | 4/1952 | Miller | 99—446 |
| 3,127,828 | 4/1964 | Fine | 99—446 |
| 3,292,528 | 12/1966 | Myler | 99—446 |

FOREIGN PATENTS

| 615,022 | 12/1948 | Great Britain. |
| 804,367 | 11/1958 | Great Britain. |

ROBERT W. MICHELL, *Primary Examiner.*

A. O. HENDERSON, *Assistant Examiner.*